United States Patent [19]
Dombro et al.

[11] 3,888,789
[45] June 10, 1975

[54] PREPARATION OF POLYMERIZATION CATALYST SYSTEMS

[75] Inventors: Robert A. Dombro; George E. Illingworth, both of Arlington Heights; Richard A. Fronczak, Mount Prospect, all of Ill.

[73] Assignee: Universal Oil Products Company, Des Plaines, Ill.

[22] Filed: Dec. 15, 1972

[21] Appl. No.: 315,720

[52] U.S. Cl.......... 252/429 B; 252/429 C; 260/93.7; 260/94.9 CA; 260/94.9 CB; 260/94.9 CC; 260/94.9 D
[51] Int. Cl.............................................. B01j 11/84
[58] Field of Search.......... 252/429 B, 431 P, 429 C

[56] References Cited
UNITED STATES PATENTS

| | | | |
|---|---|---|---|
| 3,222,296 | 12/1965 | Aftandilian | 252/429 B |
| 3,400,110 | 9/1968 | Dassesse et al. | 252/429 C X |
| 3,454,547 | 7/1969 | Delbouille et al. | 252/429 C X |
| 3,642,746 | 2/1972 | Kashiwa et al. | 252/429 B X |
| 3,663,451 | 5/1972 | Hill | 252/429 B X |

*Primary Examiner*—Patrick P. Garvin
*Attorney, Agent, or Firm*—James R. Hoatson, Jr.; Raymond H. Nelson; William H. Page

[57] ABSTRACT

Polymerization catalyst systems which are prepared by admixing an oxide of a metal of Group IIa, IIB, IIIA, or IVA with a halide of a metal selected from Group IVB, VB or VIB to chemically fix the metal halide thereon and thereafter adding an organo Group IA, IIA or IIIA metal or derivative thereof and a Lewis Base modifier to the admixture are improved by treating the oxide or the mixture of said oxide and said metal halide with a halogenating agent so that the atomic ratio of halide to Group IVB, VB or VIB metal is greater than 10:1 and preferably greater than 20:1.

13 Claims, No Drawings

PREPARATION OF POLYMERIZATION CATALYST SYSTEMS

BACKGROUND OF THE INVENTION

The prior art is replete with various processes for the polymerization of olefinic hydrocarbons utilizing many varied and substantially different catalyst systems. For example, it is known to prepare and use a catalyst in which a derivative of and especially a hydroxy halide of a bivalent metal of Group IIA of the Periodic Table is reacted with a halide, haloalkoxide or alkoxide of a transition metal of Group IVB, VB or VIB of the Periodic Table by adding a suspension of the bivalent metal derivative to a liquid composed substantially of the transition metal derivative at a temperature in the range of from about 80° to about 180° C. and the reaction product which results is activated with an organometallic compound of a metal of Group IA, IIA, IIIA or IVA of the Periodic Table. However, the use of these catalysts, especially in the homopolymerization of propylene results in a polypropylene of low crystallinity which is typically 40 to 50 wt. % insoluble in boiling n-heptane. Likewise, another particularly well-known prior art polymerization catalyst which is widely used is known commercially as a Ziegler-Natta type catalyst which is usually a titanium trichloride-aluminum chloride complex combined with an aluminum alkyl. When utilizing this catalyst, highly crystalline polymers are obtained in a moderate yield based on titanium. For example, when polymerizing propylene under the conditions cited in the examples of the prior art, there will be obtained yields up to about 1,000 grams of polypropylene per gram of titanium on a noncommercial scale. However, substantially less than 50% of the titanium in these catalysts are in usable form. The particular catalyst which is set forth in the prior art will usually determine the form of the resultant polymer and the amount of the finished polymer which is obtained thereby when being utilized in a polymerization process, said resultant polymer usually being in either liquid or solid form. In addition, the various catalysts of the prior art will also determine the physical characteristics of the polymeric product, such characteristics pertaining to elongation, tensile strength, particle size, molecular weight, etc.

As will be hereinafter shown in greater detail, by utilizng a polymerization catalyst system, which is prepared according to the process of this invention, it will be possible to obtain higher yields of crystalline polymers based on the amount of the Group IVB, VB or VIB metal as well as obtaining the polymer in high degree of crystallinity and in a desirable molecular weight range.

This invention relates to a process for the preparation of polymerization catalyst systems. More specifically the invention is concerned with a process for preparing polymerization catalyst systems which may be used in a polymerization reaction to provide polymers which will possess certain desirable physical characteristics.

The polymers which are obtained by utilizing the polymerization catalyst systems which are prepared according to the process of the present invention may be utilized in many forms and configurations. For example, the polymers prepared when utilizing a catalyst system, the preparation of which is hereinafter set forth in greater detail, will be substantially crystalline in form, the desired product such as polypropylene being generally greater than 80% heptane-insoluble, and the molecular weight being in the range of from about 300,000 to about 700,000.

It is therefore an object of this invention to provide a process for the preparation of polymerization catalyst systems.

A further object of this invention is to provide a process for the preparation of polymerization catalyst systems which may be utilized to form polymers possessing certain desirable physical characteristics.

In one aspect an embodiment of this invention resides in a process for the preparation of a polymerization catalyst system which comprises admixing a high surface area oxide of a metal of Group IIA, IIB, IIIA or IVA with a Group IVB, VB or VIB metal halide at an elevated temperature, thereafter adding an organo Group IIA or IIIA metal or derivative thereof and a Lewis Base modifier to the resultant admixture, said addition being carried out while maintaining the compounds in an inert atmosphere, and recovering the resultant polymerization catalyst system, the improvement which comprises treating said oxide prior to admixture with said metal halide or treating said admixture with said oxide and said metal halide subsequent to admixing thereof with a halogenating agent having the formula

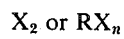

$$X_2 \text{ or } RX_n$$

in which R is hydrogen, SO, $SO_2$ or hydrocarbyl radicals, X is a halogen, preferably chlorine or bromine, and n is an integer of from 1 to 10.

A specific embodiment of this invention is found in a process for the preparation of a polymerization catalyst system which comprises treating magnesium oxide with thionyl chloride, admixing the chlorided magnesium oxide with titanium tetrahalide at a temperature in the range of from about 100° to 140° C., thereafter adding triisobutylaluminum and diethylphenylphosphine to the product, the additions being carried out while maintaining the compounds in an inert atmosphere, suspended in an inert liquid medium, and utilizing the resultant polymerization catalyst system.

Other objects and embodiments will be found in the following further detailed description of the present invention.

As hereinbefore set forth the present invention is concerned with a process for the preparation of an improved catalyst which is utilized for the homopolymerization or copolymerization of olefins or olefin derivatives whereby the crystallinity and other properties of the resulting polymer or copolymer are substantially improved without a significant and corresponding loss of catalyst activity. As was hereinbefore set forth, catalysts or catalyst systems employing titanium as one of the components thereof which have been utilized in the polymerization of olefinic hydrocarbons as shown in the prior art have had several disadvantages in that the amount of titanium which was usable to polymerize the olefins was relatively low, usually being substantially less than about 50% of the total titanium of the catalyst system and would show only moderate catalytic activity per titanium and the molecular weight of the polymer produced being so high as to require control. In contradistinction to these catalysts, we have now discovered that polymerization catalyst systems which may be prepared according to the process of the present invention will permit the titanium which is present in the system to be more effectively utilized for catalytic activity with a correspondingly greater amount of polymer per gram of titanium being obtained thereby. In addition, by utilizing the supported catalyst system which is prepared according to the process of this invention, it is possible to obtain a polymeric material which possesses a high degree of crystallinity, said polymer, especially in the case of polypropylene, being generally greater than 80% heptane-insoluble. In addition, the polymer produced, especially in the case of polypropylene, falls into the desired molecular weight range. It is to be understood that the term "polymerization" as used in the present specification and appended claims will include homopolymerization of olefinic hydrocarbons such as ethylene, propylene, butene-1, etc. and copolymerization of dissimilar olefinic hydrocarbons such as the copolymerization of ethylene and propylene, ethylene and butylene, propylene and butylene, etc.

Examples of olefinic hydrocarbons which may be polymerized by utilizing a polymerization catalyst system prepared according to the process of this invention will include those olefinic hydrocarbons containing from 2 to about 8 carbon atoms in the molecule such as ethylene, propylene, 1-butene, 1-pentene, 1-hexene, 1-heptene, 1-octene, 3-methylbutene-1, 3-methylbutene-2, etc. In addition, it is also contemplated within the scope of this invention, that isomers of the above olefins such as 2-butene, 2-pentene, 2-hexene, 3-hexene, 2-heptene, 3-heptene, 3-octene, 4-octene, 2-methyl-2-butene, 2-methyl-2-pentene, 2-methyl-2-hexene, or a chlorinated olefin such as vinyl chloride may also be used as a starting material, although the resultant polymers may not be obtained with equivalent results.

The polymerization catalyst systems which are obtained by utilizing the process of the present invention will comprise (1) a halide of a metal selected from Groups IVB, VB or VIB, chemically fixed on a solid support comprising an oxide of a metal selected from Groups IIA, IIB, IIIA and IVA, (2) an organo Group IA, IIA or IIIA metal or derivative thereof and (3) a Lewis Base modifier. it is to be understood that the term "Lewis Base modifier" as used in the present specification and appended claims may be used interchangeably with the term "Lewis Bases." The Lewis bases are substances which provide the pairs of electrons for the open sextet of electrons whereby the compounds are able to form addition compounds by sharing electrons provided by the second component.

Examples of halides of metals selected from Groups IVB, VB or VIB of the Periodic Table which may be utilized as one of the components of the catalyst system will include titanium tetrachloride, titanium tetrabromide, titanium tetraiodide, zirconium tetrachloride, zirconium tetrabromide, zirconium tetraiodide, hafnium tetrachloride, hafnium tetrabromide, hafnium tetraiodide, vanadium dichloride, vanadium trichloride, vanadium tetrachloride, vanadium dibromide, vanadium tribromide, vanadium tetrabromide, niobium pentachloride, niobium pentabromide, niobium pentaiodide, tantalum pentachloride, tantalum pentabromide, tantalum pentaiodide, chromium trichloride, chromium triiodide, chromium tribromide, molybdenum dichloride, molybdenum trichloride, molybdenum tetrachloride, molybdenum pentachloride, molybdenum dibromide, molybdenum tribromide, molybdenum tetrabromide, molybdenum pentabromide, tungsten dichloride, tungsten tetrachloride, tungsten pentachloride, tungsten hexachloride, tungsten diiodide, tungsten dibromide, tungsten pentabromide, etc.

The solid support on which the halide of a metal selected from Groups IVB, VB or VIB is chemically fixed comprises an oxide of a metal selected from Groups IIA, IIB, IIIA or IVA of the Periodic Table. Some specific examples of these oxides of metals comprise magnesium oxide, beryllium oxide, calcium oxide, strontium oxide, barium oxide, zinc oxide, cadmium oxide, aluminum oxide, boron oxide, silicon oxide, etc. It is also contemplated within the scope of this invention that other oxides such as tin oxide, lead oxide, germanium oxide, gallium oxide, indium oxide and thallium oxide may also be used, although not necessarily with equivalent results. Of the aforementioned metal oxides, the preferred support will comprise a magnesium oxide. These magnesium oxides may have an iodine number ranging from 20 to about 180, a surface area in the range of from about 50 to about 400 square meters per gram, a pore volume ranging from about 0.05 to about 0.5 ml/g., a pore diameter in the range of from about 40 to 200A and an average ultimate particle size ranging from about 0.04 to about 50 microns. Of the magnesium oxides which possess the various physical properties within the ranges hereinbefore set forth, the magnesium oxide which is the preferred solid support will have an iodine number of about 135, a surface area of about 270 square meters per gram, a pore volume of about 0.3 ml/g., a pore diameter of about 45°A and an average ultimate particle size of about 0.09 microns.

Another component of the catalyst system of the present invention which is used to activate the catalyst component hereinbefore described will comprise an organo Group IA, IIA or IIIA metal or derivative thereof. Of the Group IA, IIA or IIIA metals, the preferred metal will comprise aluminum although it is also contemplated within the scope of this invention that lithium, gallium, indium, thallium, beryllium and magnesium may also be used. Some specific examples of these organo metal compounds derivatives thereof will include trimethylaluminum, triethylaluminum, tripropylaluminum, triisopropylaluminum, tri-n-butylaluminum, tri-t-butylaluminum, dimethylaluminum chloride, diethylaluminum chloride, dipropylaluminum chloride, diisopropylaluminum chloride, di-n-butylaluminum chloride, di-t-butylaluminum chloride, dimethylmagnesium, diethylmagnesium, dipropylmagnesium, diisopropylmagnesium, di-n-butylmagnesium, di-t-butylmagnesium, methylmagnesium chloride, ethylmagnesium chloride, propylmagnesium chloride, isopropylmagnesium chloride, butylmagnesium chloride, dimethylberyllium, diethylberyllium, dipropylberyllium, diisopropylberyllium, di-t-butylberyllium, methylberyllium chloride, ethylberyllium chloride, propylberyllium chloride, isopropylberyllium chloride, the corresponding gallium, indium, and thallium compounds, methyl lithium etc. In addition, it is also contemplated within the scope of this invention that cocatalysts selected from Group IA, IIA or IIIA metal hydrides may also be employed to activate the catalyst composite. Some specific examples of these cocatalysts will include hydrogen, lithium hydride, sodium hydride, potassium hydride, rubidium hydride, cesium hydride, magnesium hydride, calcium hydride, strontium hydride, barium hydride, aluminum hydride, gallium hydride, indium hydride, thallium hydride, etc., although not necessarily with equivalent results. It is to be understood that the aforementioned co-catalysts are only representative of the class of compounds which may be used, and that the present invention is not necessarily limited thereto.

The Lewis base modifiers which are utilized to modify the catalyst system will preferably comprise organo phosphines including alkylphosphines such as trimethylphosphine, triethylphosphine, tri-n-propylphosphine, triisopropylphosphine, tri-n-butylphosphine, tri-t-butylphosphine, etc.; triarylphosphines such as triphenylphosphine, tribenzylphosphine, tri-o-tolylphosphine, tri-m-tolylphosphine, tri-p-tolyphosphine, etc.; mixed alkylarylphosphines such as dimethylphenylphosphine, diethylphenylphosphine, di-n-propylphenylphosphine, diisopropylphenylphosphine, diphenylmethylphosphine, diphenylethylphosphine, diphenylpropylphosphine, etc., as well as the corresponding organo phosphine oxides. In addition to the preferred Lewis base modifiers hereinbefore enumerated, it is also contemplated within the scope of this invention that organoamines and organoarsines such as methylamine, dimethylamine, trimethylamine, ethylamine, diethylamine, triethylamine, propylamine, dipropylamine, tripropylamine, phenylamine, diphenylamine, triphenylamine, etc.; trimethylarsine, triethylarsine, tri-n-propylarsine, triisopropylarsine, triphenylarsine, tribenzylarsine, dimethylphenylarsine, diethylphenylarsine, etc., as well as mixed alkyl or arylamines or arsines and the corresponding organo amine oxides or organo arsine oxides may be used. Other examples of Lewis base modifiers which may be utilized as the fourth component of the catalyst system will include organo sulfide compounds such as dimethylsuflide, diethylsulfide, dipropylsulfide, diisopropylsulfide, dibutylsulfide, diphenylsulfide, dibenzylsulfide, di-(o-tolyl)sulfide, di-(m-tolyl)sulfide, di-(p-tolyl)sulfide, etc., dimethylsulfoxide, diethylsulfoxide, dipropylsulfoxide, diisopropylsulfoxide, dibutylsulfoxide, diphenylsulfoxide, dibenzylsulfoxide, di-(o-tolyl)sulfoxide, di-(m-tolyl)sulfoxide, di-(p-tolyl)sulfoxide, etc.; ether such as dimethyl ether, diethyl ether, di-n-propyl ether, diisopropyl ether, tetrahydrofuran dioxan, methyl phenyl ether (anisole), ethyl phenyl ether (phenetole), propyl phenyl ether, etc.; halophosphines such as chlorodiethylphosphine, etc.

The polymerization catalyst system of the present invention is prepared by calcining the metal oxide support which is selected from the oxides of metals of Groups IIA, IIB, IIIA and IVA of the Periodic Table in either an inert or in an oxygen atmosphere at an elevated temperature. This elevated temperature may be in the range of from 100° to about 800° C. and the calcination will proceed for a period of time ranging from about 2 to about 20 hours or more in duration. In addition, the oxygen atmosphere may be provided for by the introduction of an oxygen-containing gas such as air or oxygen into the calcination apparatus. In one embodiment of this invention the calcined support is then subjected to a halogenating agent which possesses the generic formula: $X_2$ or $RX_n$ in which R is hydrogen, SO, $SO_2$ or hydrocarbyl radical, X is halogen, preferably chlorine or bromine and n is an integer of from 1 to 10. Some specific examples of these halogenating agents which may be used will include elemental chlorine, elemental bromine, hydrogen chloride, hydrogen bromide, thionyl chloride, thionyl bromide, sulfuric oxychloride, sulfuric oxybromide, carbon tetrachloride, carbon tetrabromide, chloroform, bromoform, ethylene chloride, ethylene bromide, 1,1,1-trichloroethane, 1,1,1-tribromoethane, 1,1,2-trichloroethane, 1,1,2-tribromoethane, 2-chloropropane, 2-bromopropane, 1,2-dichloropropane, 1,2-dibromopropane, 1,3-dichloropropane, 1,3-dibromopropane, 1,1,3-trichloropropane, 1,1,3-tribromopropane, 3,3,3-trichloropropane, 3,3,3-tribromopropane, chlorobutane, bromobutane, 1,2-dichlorobutane, 1,2-dibromobutane, 1,2,4-trichlorobutane, 1,2,4-tribromobutane, 1,1,2-trichlorobutane, 1,1,2-tribromobutane, 1,1,1-trichlorobutane, 1,1,1-tribromobutane, 1,1,4,4-tetrachlorobutane, 1,1,4,4-tetrabromobutane, etc. It is also contemplated within the scope of this invention that the corresponding fluoro and iodo compounds may be used as halogenating agents, although not necessarily with equivalent results. The haliding of the metal oxide support may be accomplished over a wide range of temperatures, the operating temperatures ranging from ambient (about 20°–25° C.) up to about 400° C. and at pressures ranging from subatmospheric to 100 atmospheres. The haliding is usually accomplished by passing heated vapors of the halogenating agent over the support at an elevated temperature or by contact of the support with the haliding agent as a solution in a hydrocarbon medium. It is also contemplated that the haliding of the support may be effected by passing the halogenating agent in the form of a gas over the support while the halogenating agent is admixed with a carrier gas consisting of a substantially inert material such as argon or nitrogen.

As an alternate embodiment of the present invention the haliding step may be effected at a period subsequent to the admixture of the halide of a metal selected from Groups IVB, VB or VIB of the Periodic Table with the calcined metal oxide support. When this type of operation is preferred, the metal oxide support which has been calcined in a manner similar to that hereinbefore set forth is placed in an inert atmosphere and, if so desired, may be provided for by an inert gas such as argon, nitrogen, etc. Following this, the halide of the metal of the type hereinbefore set forth in greater detail is charged to the reaction vessel with continuous stirring. After admixture of the material is completed, the resulting slurry is stirred and heated to a temperature in the range of from about 100° to about 150° C. and is maintained thereat for a period of time ranging from about 1 to about 10 hours or more in duration. At the end of this time period, the mixture is allowed to settle and cool to a temperature in the lower end of the range hereinbefore set forth, that is, about 100° to about 120° C. The hot supernatant liquid layer is removed and a fresh metal halide is added to the solid product, this addition accompanied with stirring and followed by reheating for an additional period of time which may range from about 0.25 to about 0.5 hours. The mixture is again allowed to cool to 100° to about 120° C. and the hot clear supernatant liquid is again removed. The addition of fresh metal halide, stirring and heating may be repeated again for an additional 1 to about 10 times. After withdrawal of the unreacted metal halide has been completed the product may then be contacted with an excess of an inert organic diluent which may comprise a paraffinic hydrocarbon such as n-pentane, n-hexane, n-heptane, etc., again under an inert atmosphere such as argon or nitrogen to remove any unreacted metal halide, following which it is dried in a chamber which is alternately evacuated and filled with an inert gas such as argon. This composite of a metal halide chemically bonded to the metal oxide support may then be contacted with a halogenating agent of the type hereinbefore set forth in greater detail under an inert atmosphere such as argon or nitrogen by passing said halogenating agent in a vapor state over the surface of the composite or by contact with the haliding agent which is in the form of a slurry. The halogenating agent is used in such an amount so that the ratio of the halide to the Group IV, VB or VIB metal will be at least 10:1 and preferably greater than 20:1, a particularly effective catalyst having a halide to Group IVB, VB or VIB metal atomic ratio of between 25:1 and 40:1. As will be hereinafter shown in greater detail by exposing the metal oxide support or the composite of the Group IVB, VB or VIB metal halide chemically bonded to the metal oxide support to the action of a halogenating agent so that the ratio of halide to metal is in a range hereinbefore set forth, it will be possible to obtain a polymer which possesses a high degree of crystallinity as well as being over 80% heptane-insoluble.

The catalyst component which has been subjected to the action of the halogenating agent and which will contain the halide to metal ratio within the range hereinbefore set forth is then suspended in a liquid medium following which it is activated and modified by treatment with the remaining co-catalyst element and modifier of the system, the addition of activator comprising an organo metal or derivative thereof in which the metal is selected from Group IA, IIA or IIIA of the Periodic Table, specific examples having been hereinbefore set forth in greater detail, and the Lewis base modifier, examples also of which have been previously furnished, being effected in an inert atmosphere which is again provided for by the use of a gas such as argon or nitrogen. The addition of the organo metal or derivative thereof and the Lewis base modifier is usually effected by adding these two components of the finished catalyst system neat or dissolved in an organic diluent of the type hereinbefore set forth, that is a paraffinic hydrocarbon n-hexane, n-heptane, etc, and the resulting mixture is stirred. The finished polymerization catalyst system which is prepared in the above manner will usually contain the component in a weight % range of from about 85 to about 92 weight % of the metal oxide having the metal halide chemically fixed thereon, from about 3 to about 4 weight % of the organo metal or organo metal derivative and from about 12 to about 4 weight % of the Lewis base modifier, In addition the components will usually be present in a mole ratio of organo Group IA, IIA or IIIA metals or derivatives thereof per mole of the Group IVB, VB or VIB metal of from about 0.01:1 to about 10:1, the mole ratio of the Lewis base modifier per mole of Group IVB, VB or VIB metals of from about 0.01:1 to about 10:1. It is desirable but not essential that the mole ratio of organo Group IA, IIA, or IIIA metal or derivative thereof to Lewis base modifier be 1:1.

The polymerization catalyst system which has been prepared according to the method hereinbefore set forth may be utilized in the polymerization of olefinic hydrocarbons, especially those containing 2 to about 8 carbon atoms. The process by which said olefinic hydrocarbons are polymerized may be effected in either a batch, continuous, semicontinuous, gas phase or bulk manner of operation. For example, when a batch type operation is used, a quantity of the polymerization catalyst system which has been prepared according to the process of the present invention is placed in an appropriate apparatus, usually under an inert atmosphere which is provided for by the introduction of an inert gas such as argon or nitrogen into the system. If so desired, the catalyst system may be composited prior to its use in the polymerization apparatus, alternatively, a component of the system comprising the metal halide chemically fixed on the metal oxide support which has been subjected to a halogenation step whereby the halide to Group IVB, VB or VIB metal atomic ratio is at least 10:1 and preferably greater than 20:1 is placed in the polymerization apparatus. Following this, the remaining components of the system comprising the co-catalyst such as an organo Group IA, IIA or IIIA metal or derivative thereof and the Lewis base modifier may be thereafter added to the apparatus thereby preparing the polymerization catalyst system in situ. If so desired, the polymerization of the olefinic hydrocarbon may be effected in a liquid medium, said medium which may be utilized as the vehicle in which the polymerization reaction is effected comprising inert hydrocarbon compounds such as linear or branched chained paraffins including n-pentane, n-hexane, n-heptane, isopentane, isohexane, isoheptane, or mixtures thereof, etc. aromatic hydrocarbons such as benzene, toluene, o-xylene, m-xylene, p-xylene, ethylbenzene, etc., or other monomer or mixture of monomers which are to undergo polymerization, the monomer serving both as the medium and the polymerization component or components. Thus, for example, propylene may be polymerized under a relatively high pressure so that the propylene is in liquid form, thereby acting as both the medium and the polymerization charge stock. After all of the polymerization catalyst system has been added or formed, the apparatus, which may comprise an autoclave of the rotating or mixing type, is heated to the desired polymerization temperature which may be in a range of from about 25° to about 200° C. or more and preferably in a range of from about 50° to about 80° C., and the olefinic hydrocarbon which is to undergo polymerization is charged thereto. The pressure at which the polymerization is effected may range from atmospheric up to about 2,000 pounds per square inch, the superatmospheric pressure being provided for by the autogenous pressure of the olefin if in gaseous form, by the introduction of an inert gas such as nitrogen or argon if the olefin is in liquid form or a combined pressure resulting from the partial pressure afforded by the gaseous olefin and the remainder being provided for by the inert gas. The reactor is maintained at the predetermined conditions of temperature and pressure for a reaction period which is in a range of from about 0.5 up to about 10 hours or more in duration. At the end of the reaction period, the apparatus and contents thereof are allowed to return to room temperature, the excess pressure, if any, is discharged, the catalyst is quenched by the addition of an alcohol such as methyl alcohol, ethyl alcohol, n-propyl alcohol, isopropyl alcohol, n-butyl alcohol, etc. and the reactor is opened. The desired polymeric product is recovered and, if so desired, purified by any conventional means known in the art to remove a substantial portion of the catalyst before passage to storage.

It is also contemplated within the scope of this invention that the polymerization process for the production of predominantly crystalline polymers may be effected in a continuous manner of operation when using a polymerization catalyst system which has been prepared according to the process of the present invention. When such a type of operation is utilized, the monomer comprising the olefinic hydrocarbon is continuously charged to a reaction vessel which is maintained at the proper operating conditions of temperature and pressure, said vessel containing the polymerization catalyst system prepared according to the process of the present invention. Alternatively speaking, the reactor may be provided with one component of the catalyst system while the remaining components of the system comprising the co-catalyst and the modifier are charged to the reactor through separate lines, thus forming the polymerization catalyst system in situ. Upon completion of the desired residence time in the reaction vessel, the reactor effluent is continuously discharged and the polymer is recovered by any conventional means of which are well known in the art, any unreacted olefinic monomer being recycled to form a portion of the feed stock.

The following examples are given to illustrate the preparation of the polymerization catalyst system and the polymerization process in which olefinic hydrocarbons are converted in high yield to predominantly crystalline polymers, said examples are given merely as illustrations and are not intended to limit the generally broad socpe of the present invention in strict accordance therewith.

EXAMPLE I

In this example 40 grams of a magnesium oxide support which had a surface area of 208 square meters per gram, a pore diameter of 54A, and a pore volume of 0.28 ml/g. was calcined at a temperature of 140° C. in air under atmospheric pressure for 17 hours. At the end of this time, heating was discontinued and the magnesium oxide was subjected to a prehaliding step by placing the support in a flask and adding a solution of 59.6 grams of thionyl chloride in 300 cc. of n-heptane. The resulting mixture was heated to a temperature of 90° C. and maintained thereat for a period of 1 hour. The chloride support which was a beige solid containing 19.3% chlorine was recovered. The prehalided support in the amount of 42 grams was placed under an atmosphere of dry argon and 380 grams (2 mole) of titanium tetrachloride was added to the magnesium oxide at ambient temperature accompanied by rapid stirring of the mixture. The slurry was continuously stirred while being heated from 110° to 135° C. during a period of 1 hour. At the end of this time stirring and heating were discontinued and the mixture was allowed to settle and cool to a temperature of about 110° C., at which point the hot, supernatant, clear liquid layer was removed. A fresh batch of titanium tetrachloride (60 cc.) was added to the solid product and the resulting mixture was stirred and reheated to a temperature of 110° C. for an additional period of about 10 minutes. Following this, the mixture was allowed to settle and the hot, clear, supernatant liquid was removed. The contacting of the solid with the titanium tetrachloride was repeated 4 more times utilizing 50 cc. portions of the titanium tetrachloride each time. At the end of the contacting, the titanium tetrachloride wet product was cooled to room temperature and diluted with an excess amount of n-heptane. The product was recovered under a nitrogen blanket and washed with an additional amount of n-heptane to remove the unreacted titanium tetrachloride following which it was dried in a chamber which was alternately evacuated and filled with argon. The final composite was then stored under a blanket of argon. Analysis of the product by atomic absorption and colorimetrically disclosed the following results:

Ti, 0.98%, Cl, 28.16%, Cl:Ti atomic ratio = 38:1

The catalyst component which was prepared according to the above paragraph, 1.2 grams (0.25 mole as titanium), was placed in a polymerization bottle under a blanket of argon followed by sealing with a crown cap and a neoprene septum. Following this, about 400 cc. of n-heptane was added as the liquid medium. Thereafter about 0.8 cc aliquot of a 27.2 weight % solution of triisobutylaluminum in n-heptane (0.95 mmole as triisobutylaluminum) was added to the catalyst component suspension, the addition being accomplished while stirring at room temperature. A modifier comprising 0.07 grams (0.43 mmole) of diethylphenylphosphine was added 15 minutes later to the activated catalyst component. The mixture was then heated to a temperature of 57° C. and propylene was introduced at a pressure of 35 pounds per square inch gauge. The reaction was allowed to proceed for a period of 3.5 hours, at the end of which time the reaction mixture which contained the polymer was cooled to room temperature, the excess pressure was discharged and the catalyst was quenched with 4 cc. of n-butyl alcohol. The solid polymer was collected, washed with an alcohol-water solution and dried. It was found that the activity of the catalyst was 5160 grams of polymer per gram of titanium or 51.2 grams of polymer per gram of catalyst. In addition the granular polypropylene thus prepared was 70.4 weight % insoluble in boiling n-heptane.

EXAMPLE II

In this example magnesium oxide having properties similar to that set forth in Example I above was prehalided by treating 20 grams (0.5 mole) of the magnesium oxide with a solution of 30 grams (0.25 mole) of thionyl chloride in 150 cc. of n-heptane at a temperature in the range of from 70° to 91° C. for a period of 1 hour. The prechlorided support which was recovered from this step was light violet in color, analysis of the support disclosing that there was 18.6 weight % chlorine on the support. Following this 20 grams of the prechlorided magnesium oxide was placed under an atmosphere of dry argon and 190 grams of titanium tetrachloride was added to the powdered magnesium oxide at ambient temperature accompanied by vigorous stirring of the mixture. The mixture was heated from about 110° to 135° C. during a period of 1 hour while continuously stirring the slurry. At the end of the 1-hour period, stirring and heating were discontinued, the mixture was allowed to settle and cool to a temperature of about 110° C., at which point the hot, supernatant, clear liquid layer was removed. A fresh batch of titanium tetrachloride was added to the solid product and the resulting mixture was stirred while being reheated to a temperature of 110° C. for a period of 10 minutes. The mixture was again allowed to settle and the hot, clear, supernatant liquid was removed. Titanium tetrachloride was again added to the magnesium oxide two more times and the procedure was repeated, that is, heating and stirring, settling and removal of the liquid. Following completion of the addition of the titanium tetrachloride, the product mixture was cooled to room temperature and diluted with an excess amount of n-heptane. The product was recovered under a nitrogen blanket and washed with n-heptane to remove the unreacted titanium tetrachloride and dried in a chamber which was alternately evacuated and filled with argon. The final composition was stored under an argon blanket. Analysis of the product disclosed the presence of 0.97% titanium, 27.19 weight % of chlorine and a chlorine: titanium atomic ratio of 37:1.

The desired polymerization catalyst was prepared by treating 2.47 grams of the prechlorided catalyst component containing 0.5 mmole as titanium with 0.325 grams of triisobutylaluminum (1.6 mmoles as triisobutylaluminum, the reaction being effected in a polymerization bottle under a blanket of argon using n-heptane as the liquid medium. The addition of the triisobutylaluminum to the catalyst component was accomplished at room temperature with continuous stirring. Thereafter 0.23 grams of a Lewis Base modifier comprising ethyldiphenylphosphine (1.4 mmole of ethyldiphenylphosphine) was added, the mixture was heated to a temperature of 60° C. and propylene was introduced at a pressure of 35 pounds per square inch gauge. The reaction was allowed to proceed for a period of 5 hours at the end of which time the reaction mixture containing the polymer was cooled to room temperature, the excess pressure was discharged and the catalyst was quenched with 4 cc. of n-butyl alcohol. The solid polymer was collected, washed with an alcohol:water solution and dried. It was found that the activity of the catalyst was 3,000 grams of polymer per gram of titanium or 30 grams of polymer per gram of catalyst. The granular polypropylene produced was 76 weight % insoluble in boiling n-heptane and had an intrinsic viscosity molecular weight of 403,000.

EXAMPLE III

To illustrate the use of a different type of prehaliding agent, a magnesium oxide was possessed physical properties similar to that set forth in the above examples was calcined at a temperature of about 135° C. under a flow of argon for a period of 2 hours. Thereafter 20 grams (0.5 mole) of the magnesium oxide was prehalided by being subjected to a flow of 1,1,1-trichloroethane in a carrier gas comprising argon for a period of 6 hours while maintaining the apparatus at a temperature in a range of from 147° to 343° C. At the end of this 6-hour period, heating was discontinued and the support allowed to return to room temperature. The chlorided magnesium oxide which was medium gray in appearance was analyzed and found to contain 11.3% of chlorine on the support.

The prehalided support prepared according to the above paragraph is then utilized as one portion of the catalyst component by placing the magnesium oxide under an atmosphere of dry argon and adding 190 grams (1 mole) of titanium tetrachloride to the powdered prehalided magnesium oxide at ambient temperature accompanied by a vigorous stirring of the mixture. The resulting slurry is continuously stirred while being heated from 110° to about 135° C. during a period of 1 hour. At the end of this time period, heating is discontinued and the mixture is allowed to settle and cool to a temperature of about 105° C., at which point the hot, supernatant, clear liquid layer is removed. A fresh batch of titanium tetrachloride in the amount of 60 cc. is added to the solid and the resulting mixture is stirred and reheated to a temperature of 110° C. for a period of about 10 minutes. This mixture is then allowed to settle and the hot, supernatant, clear liquid layer is again removed. The above procedure is repeated two more times with removal of the liquid layer after each period of settling. At the end of the second addition step, the product is recovered under a nitrogen blanket and washed with n-heptane to remove unreacted titanium tetrachloride. Following this, the product is dried and the catalyst component is placed in a polymerization bottle under a blanket of nitrogen. A liquid medium comprising n-heptane is added following which a solution of triisobutylaluminum in a ratio of about 3:1 mmole of triisobutylaluminum per mmole of fixed titanium is added to activate the catalyst. The finished polymerization catalyst is thereafter prepared by adding diethylphenylphosphine in an approximate 1:1 ratio of diethylphenylphosphine to triisobutylaluminum while maintaining the catalyst at ambient temperature.

Utilization of this catalyst in the polymerization of propylene will result in the obtention of a solid polymer which will be over 80 weight % insoluble in boiling n-heptane and will be present in such an amount that the activity of the catalyst will be over 3,000 grams of polymer per gram of titanium present in said catalyst.

EXAMPLE IV

As an illustration of an alternative method of preparing a polymerization catalyst according to the process of this invention, a magnesium oxide which possesses the physical properties similar to that magnesium oxide which was utilized in Example I above is calcined at a temperature of about 140° C. in air at atmospheric pressure for a period of about 4 hours. At the end of this time, heating is discontinued and the magnesium oxide is placed under an atmosphere of dry nitrogen. A portion (40 grams) of this magnesium oxide is treated with 190 grams (1 mole) of titanium tetrachloride by adding the titanium tetrachloride to the powdered magnesium oxide at 0° C. while vigorously stirring the mixture. The slurry is then heated to a temperature of 110° C. and maintained in a range of from 110° to 135° C. for a period of 1 hour. At the end of this time, stirring and heating are discontinued and the mixture is allowed to settle. After reaching a temperature of about 105° C., the hot, supernatant, clear liquid layer is removed and an additional 60 cc. of titanium tetrachloride is added to the solid product. The resulting mixture is stirred and reheated to a temperature of 110° C. for a period of 10 minutes following which the mixture is again allowed to settle and the hot, clear, supernatant liquid is removed. This procedure is followed two more times utilizing 50 cc. portions of titanium tetrachloride for each addition. At the end of the second addition and after a decantation of the hot, clear, supernatant liquid, the product is cooled to room temperature and diluted with an excess amount of n-heptane. The product is recovered under a nitrogen blanket and washed with an additional amount of n-heptane to remove any unreacted titanium tetrachloride which still may be present. The catalyst component is dried in a chamber which is alternately filled and evacuated with nitrogen and thereafter subjected to an additional haliding step by contacting a solution of thionyl chloride in n-heptane with the catalyst component, the haliding of the catalyst composite being accomplished in an oxygen-free atmosphere of nitrogen. After contact time of 1 hour has elapsed, the excess thionyl chloride is removed.

The catalyst component which is prepared according to the above paragraph and which will possess a chloride:titanium atomic ratio of about 30:1 is then placed in a polymerization bottle under a blanket of nitrogen followed by sealing with a crown cap and a neoprene septum. A liquid medium comprising about 400 cc. of n-heptane is added and thereafter a 25 weight % solution of triisobutylaluminum in n-heptane is added to the catalyst component while stirring the mixture at room temperature. The thus activated catalyst is then modified by adding a Lewis base modifier comprising diethylphenylphosphine thereto. After the addition of the modifier, the finished polymerization catalyst is then utilized in the polymerization of propylene by heating the mixture to a temperature of about 60° C. and introducing propylene into the polymerization bottle at a pressure of about 35 pounds per square inch gauge. The reaction is allowed to proceed for a period of about 5 hours, at the end of which time the mixture is allowed to cool to room temperature, the excess pressure is discharged and the catalyst is quenched by the addition of n-butyl alcohol. The solid polymer which is formed during the reaction is washed with an alcohol:water solution and dried. It will be found that this catalyst is over 80 weight % insoluble in boiling n-heptane and will possess an activity of over 3,000 grams of polymer per gram of titanium.

EXAMPLE V

In this example 1 mole of magnesium oxide is calcined at a temperature of about 145° C. under a nitrogen blanket for a period of about 2 hours. The thus calcined magnesium oxide is treated in a manner similar to that set forth in the above examples with titanium tetrachloride at a temperature in the range of from about 110° C. to about 135° C. for a period of 1 hour. The mixture is allowed to cool to a temperature of about 105° C. and the clear, supernatant liquid layer is removed. The addition of titanium tetrachloride to the support is repeated three more times with heating, stirring, cooling, followed by removal of the supernatant liquid layer in each instance. After removal of the liquid layer for the last time, the catalyst component is diluted with n-heptane to remove any unreacted titanium tetrachloride, recovered under a nitrogen blanket and dried. The dried catalyst component is then treated with an excess of hydrogen chloride gas utilizing nitrogen as a carrier gas for the haliding agent. The treatment is effected in the vapor phase at a temperature of about 200° C. for a period of about 2 hours. At the end of this time, the halided catalyst component which contains a chlorine:titanium ratio of about 25:1 is then activated by the addition of triisobutylaluminum and modified by the further addition of diethylphenylphosphine. After addition of the latter compound, the finished catalyst is utilized in the polymerization reaction by passing a stream of propylene into the reaction vessel at a pressure of about 35 pounds per square inch gauge for a period of about 3.5 hours. Analysis of the solid polymer which is recovered from the reaction vessel will disclose that the polymer is over 80 weight % insoluble in boiling n-heptane and will have an activity of over 3,000 grams of polymer per gram of titanium.

EXAMPLE VI

To illustrate the necessity for prehaliding the support before the addition of a co-catalyst and a modifier in order to obtain a higher yield of polymer based on the amount of the catalyst plus a high degree of crystallinity, a series of experiments were run in which this step was omitted. The catalyst support comprised a magnesium oxide similar in nature to that described in the above examples, especially Example 1. The magnesium oxide was not subjected to a prehaliding step but was treated with titanium tetrachloride so that the catalyst comprising titanium tetrachloride chemically bonded to the magnesium oxide contained 5.172 weight % of titanium, 29.2 weight % of chlorine and had a chlorine:titanium atomic ratio of 8:1. Likewise, a second magnesium oxide support was treated with titanium tetrachloride in like manner, the catalyst after treatment thereof comprising titanium tetrachloride chemically bonded to the magnesium oxide contained 3.9 weight % of titanium 27.8 weight % of chlorine and had a chlorine:titanium atomic ratio of 10:1. Both catalysts were thereafter treated with a co-catalyst comprising triisobutylaluminum and modified with diethylphenylphosphine. The first activated catalyst contained 0.45 mmoles of titanium, 1.5 mmoles of triisobutylaluminum and 1.5 mmoles of diethylphenylphosphine. This catalyst is used to polymerize propylene in a manner similar to that set forth in Example I above and the resulting polymer was collected. It was found that the activity of this catalyst was 262 grams of polymer per gram of titanium or 13 grams of polymer per gram of catalyst. In addition, the polypropylene was 87 weight % insoluble in boiling n-heptane. The second activated catalyst contained 0.4 mmole of titanium, 1.7 mmole of triisobutylaluminum and 1.67 mmole of diethylphenylphosphine. When this catalyst was used to polymerize propylene, the activity of the catalyst was found to be 656 grams of polymer per gram of titanium or 26 grams of polymer per gram of catalyst with 83 weight % of the polymer insoluble in boiling heptane. It is therefore readily apparent that the activity of the catalyst was exceedingly low when compared to the activity of a catalyst such as that set forth in Example I which was prehalided prior to the addition of a co-catalyst and the modifier.

Likewise three more catalysts which were not prehalided but contained chlorine:titanium atomic ratios ranging from 8:1 to 10:1 and which contained about 0.4 mmoles of titanium, about 1.7 to 2.4 mmoles of triisobutylaluminum, and from 0 to 0.6 mmoles of diethylphenylphosphine when used to polymerize propylene, had activities ranging from 3,825 to 5,107 grams of polymer per gram of titanium and from 126 to 200 grams of polymer per gram of catalyst. However, the amount of polymer which was insoluble in boiling heptane ranged from 40 weight % to 62 weight %. In addition, the molecular weight of the polymer was also low. This also illustrates that a catalyst which is not prepared according to the process of this invention will be unable to produce a polymer which has a high degree of insolubility in boiling n-heptane as well as being obtained in a high yield based on the amount of catalyst used.

EXAMPLE VII

As a further illustration of the necessity of having all of the components of the catalyst system present, two more experiments were performed in which magnesium oxide supports similar in nature to that set forth in Example I above were prehalided. The first catalyst was prehalided with thionyl chloride so that the catalyst, after being treated with titanium tetrachloride contained 1.0 weight % of titanium, 28.16 weight % of chlorine and had a chlorine:titanium atomic ratio of 38:1. This catalyst was activated by the addition of a co-catalyst comprising triisobutylaluminum but was not modified by the addition of any Lewis base modifier. The catalyst system which contained 0.30 mmoles of titanium and 1.14 mmoles of triisobutylaluminum was used to catalyze the polymerization of propylene in a process similar to that described in Example I above. It was found that the activity of the catalyst was 6,757 grams of polymer per gram of titanium or 68 grams of polymer per gram of catalyst. However, the polypropylene was only 40 weight % insoluble in boiling n-heptane as contrasted to the polypropylene which was prepared in Example I using a catalyst which was prehalided prior to activity with the co-catalyst and modified by the addition of a Lewis base modifier, this catalyst producing a polymer which was 70.4 weight % insoluble in boiling n-heptane.

A second catalyst support comprising magnesium oxide was also prehalided with hydrogen chloride prior to treatment with titanium tetrachloride, the finished catalyst containing 1.35 weight % of titanium, 30.1 weight % of chlorine and had a chlorine:titanium atomic ratio of 30:1. The catalyst was activated by the addition of a co-catalyst comprising triisobutylaluminum but was not modified by the addition of a Lewis base modifier. The catalyst which contained 0.25 mmole of titanium and 0.97 mmoles of triisobutylaluminum was used to catalyze the polymerization of propylene. The activity of this catalyst was relatively high, 9,588 grams of polymer per gram of titanium being obtained or 129 grams of polymer per gram of catalyst. However, like the polypropylene which was prepared according to the above paragraph, was only 51 weight % insoluble in boiling n-heptane.

It is therefore readily apparent from a comparison of the polypropylenes which were prepared in Examples VI and VII to the polypropylenes which were prepared in preceding Examples I through V that the former (the polypropylenes from Examples VI and VII) are either less insoluble in boiling heptane or are not produced in the yields which are obtained when using a catalyst prepared according to the process of this invention.

We claim as our invention:

1. In the preparation of a polymerization system wherein a metal alkyl, metal alkyl halide or metal hydride of an a Group IA, IIA or IIIA metal and a Lewis Base modifier selected from the group consisting of hydrocarbyl phosphines, hydrocarbyl phosphine oxides, hydrocarbyl amines, hydrocarbyl amine oxides, hydrocarbyl arsines, hydrocarbyl arsine oxides, hydrocarbyl thioethers, hydrocarbyl oxyethers and hydrocarbyl sulfoxides are added to a halide of a Group IVB, VB or VIB metal supported on an oxide of a metal of Group IIA, IIB, IIIA or IVA while maintaining the compounds in an inert atmosphere, the improvement of haliding said Group IIA, IIB, IIIA or IVA metal oxide either before or after admixture of said metal oxide with said Group IVB, VB or VIB halide by contact at a temperature of from about 20°C. to about 400°C. with a halogenating agent in an amount sufficient to insure that the halide to Group IVB, VB or VIB metal atomic ratio is greater than 10:1, said halogenating agent having the formula:

$$X_2 \text{ or } RX_n$$

in which R is a hydrogen, SO, $SO_2$ or hydrocarbyl radical, X is a halogen and $n$ is an integer of from 1 to 10.

2. The improvement as set forth in claim 1 in which said halogenating agent is thionyl chloride.

3. The improvement as set forth in claim 1 in which said halogenating agent is hydrogen chloride.

4. The improvement as set forth in claim 1 in which said halogenating agent is thionyl bromide.

5. The improvement as set forth in claim 1 in which said metal halide is titanium tetrachloride.

6. The improvement as set forth in claim 1 in which said metal oxide is magnesium oxide.

7. The improvement as set forth in claim 1 in which said organo metal is triisobutylaluminum.

8. The improvement as set forth in claim 1 in which said Lewis Base modifier is diethylphenylphosphine.

9. The improvement of claim 1 wherein said atomic ratio is greater than 20:1.

10. The improvement of claim 1 wherein the metal alkyl is a metal trialkyl having from 1 to 4 carbon atoms in each of the alkyl groups and said Lewis Base modifier is a trialkyl phosphine having from 1 to 4 carbon atoms in each of the alkyl groups.

11. The improvement of claim 1 wherein the metal alkyl is a trialkyl metal having from 1 to 4 carbon atoms in each of the alkyl groups and said Lewis Base modifier is selected from the group consisting of trialkyl phosphines having from 1 to 4 carbon atoms in each of the alkyl groups, tri-phenyl phosphine, tri-benzyl phosphine, tri-tolyl phosphine, dialkyl phenyl phosphines having from 1 to 3 carbon atoms in each of the alkyl groups, and di-phenyl alkyl phosphines having from 1 to 3 carbon atoms in the alkyl group.

12. The improvement of claim 1 wherein the metal alkyl halide is a di-alkyl metal chloride having from 1 to 4 carbon atoms in each of the alkyl groups.

13. The improvement of claim 1 wherein said Lewis Base modifier is selected from the group consisting of trialkyl phosphines having from 1 to 4 carbon atoms in each of the alkyl groups, tri-phenyl phosphine, tri-benzyl, phosphine, tri-tolyl phosphine, di-alkyl phenyl phosphines having from 1 to 3 carbon atoms in each of the alkyl groups, and di-phenyl alkyl phosphines having from 1 to 3 carbon atoms in the alkyl group.

* * * * *